Nov. 1, 1938. J. W. UREN 2,135,059
DEVICE FOR CONTINUOUSLY VACUUMIZING CONTAINERS
Filed April 16, 1935 3 Sheets-Sheet 1

Nov. 1, 1938.                J. W. UREN                2,135,059
        DEVICE FOR CONTINUOUSLY VACUUMIZING CONTAINERS
            Filed April 16, 1935        3 Sheets-Sheet 3
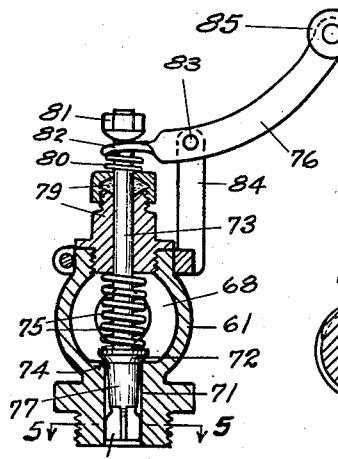
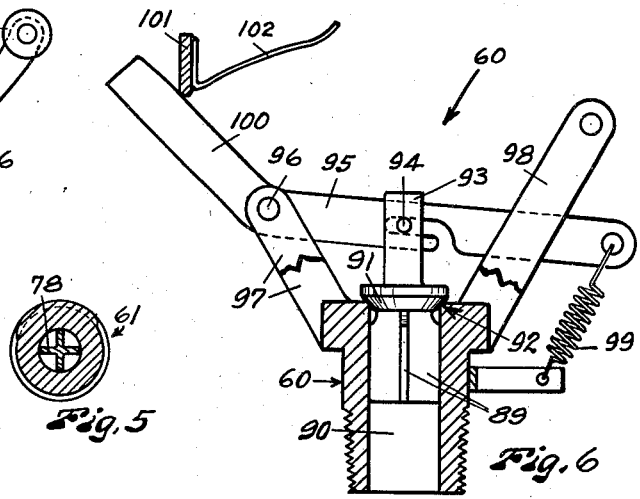
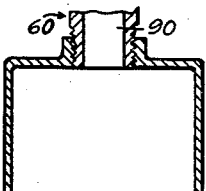
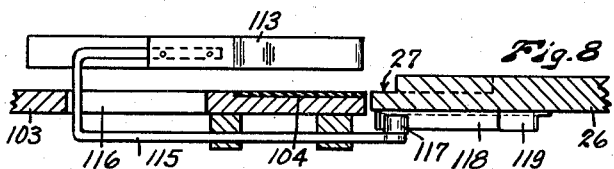
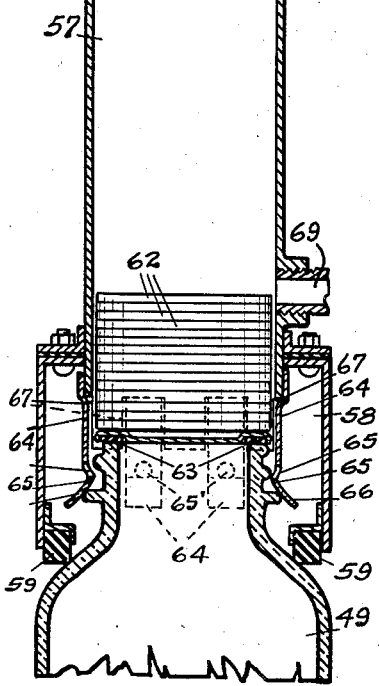
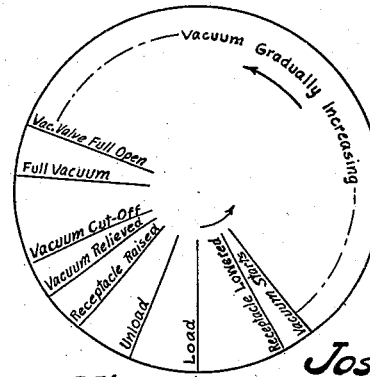
INVENTOR.
Joseph W. Uren
BY
ATTORNEY Patented Nov. 1, 1938

2,135,059

UNITED STATES PATENT OFFICE 2,135,059

DEVICE FOR CONTINUOUSLY VACUUMIZING CONTAINERS

Joseph W. Uren, Seattle, Wash., assignor to Crescent Manufacturing Co., Seattle, Wash., a corporation of Washington Application April 16, 1935, Serial No. 16,635

8 Claims. (Cl. 226—82)

This invention relates to a device for continuously vacuumizing containers. More particularly, this invention relates to a device for continuously vacuumizing jars containing a food product, as freshly ground and roasted coffee, and sealing such jars while vacuumized.

In the art of preserving freshly ground and roasted coffee, it has been generally recognized that the fine qualities of freshly ground and roasted coffee may be preserved for a longer period of time if the said coffee is vacuum packed. Heretofore the containers used generally constituted tin containers and the devices available for vacuumizing were capable only of operation on such containers.

The advisability of packing freshly ground and roasted coffee in tin containers has been severely questioned and many manufacturers are now packing such coffee in glass jars of a type having a releasable lid and rubber seal means between the jar and the lid. Many benefits inhere in the use of such glass jar containers, such as (1) the glass of the container is free of contaminating substances or odors, (2) the jars may be reused for home packing fruit and the like, (3) glass jars permit greater vacuum than the ordinary tin containers.

Such use of new containers has resulted in a demand for a device for vacuumizing glass jars in which ground coffee is packed. However, the only vacuumizing devices available on the market for use on glass jars are of a type known as batch treatment devices. As distinguished from such batch treatment devices, my device is of a continuously operating type in which the jars packed with coffee are continuously fed into the machine, vacuumized, sealed and delivered from the machine at a minimum cost and in a minimum period of time.

It is a particular object of my invention to provide for the gradual vacuumizing of the jar containing coffee so that none of the coffee in the jar will be drawn out as the pressure within the jar is reduced.

It is a further particular object of my invention to provide for a sudden increase of pressure on the jar cap, after the jar has been vacuumized, so that this pressure urges the cap against the rubber sealing means between the cap and the jar and leakage between the jar and the cap is prevented, even though the cap is not precisely made.

Another object of my invention is to provide a leak-proof connection between a vacuum chamber and the top portion of a glass jar container.

Another object of my invention is to provide a means to deliver jars filled with coffee from a traveling belt into a vacuumizing device and to deliver, from the vacuumizing device to a traveling belt, jars which have been vacuumized and sealed.

Another object of my invention is to provide a rapid, efficient, and economical vacuumizing device for continuous use on glass jars packed with ground coffee.

Another object of the invention is to provide a vacuumizing device in which the valve means controlling the vacuumizing of a receptable are not operative unless the jar or container is in vacuumizing engagement with the receptacle.

Another object of the invention is to provide a vacuumizing and sealing receptacle in which a receptacle for caps is provided which will retain all of the caps in the receptacle, except the cap sealed to the container.

Another object of the invention is to provide a container supporting means which will support a container in a position to support the vacuumizing and sealing receptacle thereabove.

The above mentioned general objects of my invention, together with others inherent in the same, are attained by the device illustrated in the following drawings, the same being preferred exemplary forms of embodiment of my invention, throughout which drawings like reference numerals indicate like parts:

Fig. 3 is a vertical sectional view, on a larger scale, of one of the vacuumizing receptacles embodied in the invention, showing the same in vacuumizing relation with respect to a container;

Fig. 4 is a sectional view, on a larger scale, of a slow opening vacuum control valve embodied in this invention;

Fig. 5 is a sectional view on broken line 5—5 of Fig. 4;

Fig. 6 is a sectional view, on a larger scale, of a quick opening vacuum release valve embodied in the invention showing the same in operative relation to its actuating means;

Fig. 7 is a detached front elevation of a track ring which controls the vertical movement of the vacuumizing receptacles;

Fig. 8 is a fragmentary view, partly in section and partly in elevation, of parts of the mechanism for feeding containers, which are to be vacuumized, onto the rotating table of the machine;

Fig. 9 is a fragmentary plan view of the feeding mechanism shown in Fig. 8; and

Fig. 10 is an operating diagram showing diagrammatically the operation of the machine.

Figure 1:
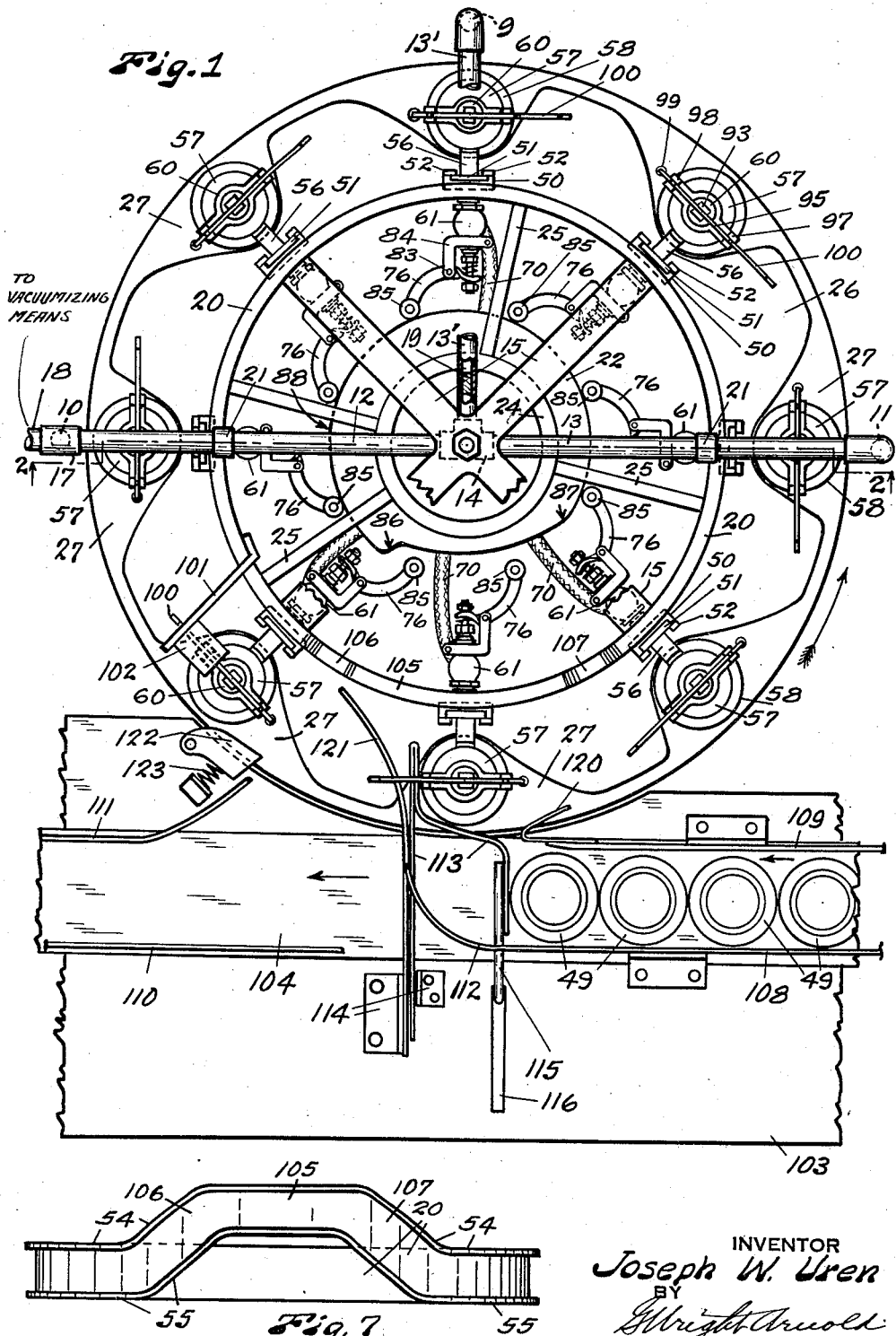
Figure 1 is a plan view of a continuous feed vacuumizing and sealing machine constructed in accordance with this invention, parts being broken away.

In the drawings, the numerals 9, 10 and 11 designate upright fixed frame members positioned at the sides of the machine and extending upwardly to a location above the operating parts of the machine. The top ends of the upright frame members 9, 10 and 11 are rigidly interconnected by transverse frame members 12, 13 and 13'. All of the frame members 9 to 13, inclusive and 13' may be pipes, as shown, or they may be of various other forms. A special fitting 14 connects the several frame members 12, 13 and 13' and provides means to which a truss member 15 and a downwardly extending vacuum pipe 16 are connected.

In the present disclosure, I have utilized the transverse frame member 12 as a vacuum conduit. This frame member 12 is connected by a T type fitting 17 with a vacuum pipe 18 which may extend to, and be connected with, any suitable source, not shown, for the production of vacuum. The T type fitting 17 also serves as a means for rigidly connecting the transverse frame member 12 with the upright frame member 10. The frame members 10, 14 and 13' may be plugged as at 19 or any other suitable means may be provided to seal the frame members so that there will be no loss of vacuum due to the incidental connection of the vacuum conduits with the frame members.

A track ring 20, of channel shaped cross section, is fixedly supported by the truss member 15 and by upright supports 21 which extend from the frame members 12 and 13 directly down to the track ring 20. A cam member 22 is fixedly supported below the track ring 20. The supporting means for the cam member 22 comprises supporting members 23 extending upwardly from the cam member 22 and secured to a ring member 24. The ring member 24 is supported from the track ring 20 by spoke like members 5.

A rotatably mounted horizontal table 6 is provided below the cam member 22. This table has a plurality of counter-sunk recesses 7 in its top surface extending from the periphery inwardly. These recesses 27 are provided for the reception of containers 49 which are to be vacuumized. The table 26 is secured, as by a hub member 28, to an upright rotatable post 29. The lower end portion of the post 29 is secured to a shaft 30. The shaft 30 extends downwardly through a housing 31 and is provided below said housing 31 with a thrust bearing means 32 supported on a fixed bearing support 33. A worm wheel 34 is secured to the shaft 30 and positioned within the housing 31. A worm 35 on a shaft 36 meshes with the worm wheel 34. The shaft 36 has a relatively large belt pulley 37 secured thereto. A belt 38 connects the belt pulley 37 with a smaller belt pulley 39 on the shaft of a motor 40. This illustrates a relatively slow speed drive for the post 29 and table 26. In this drive the speed is reduced, first, through the belt pulleys 37—39 and belt 38 and, second, through the worm drive 35—34.

The thrust bearing 32 forms a support for the shaft 30 and post 29 and may help to support the table 26. The table 26 is further supported by rollers 41, mounted on the under side of the table and rolling on a circular track 42. The circular track 42 is supported from the frame members 9, 10 and 11 by brackets 43.

The post 29 projects above the table 26 and has a cap member 44 fixedly secured to the upper end portion thereof. The vacuum pipe 16 extends downwardly into the cap 44 and contributes to the mechanical stability of the machine by helping to support the post 29 in correct alignment. A packing gland 45 is provided in the upper portion of the cap 44 around the pipe 16 to prevent air leakage when a vacuum is exerted within the cap 44. The post 29 is of tubular construction and the upper end portion of said post serves as a part of the vacuum conduit means. A vacuum manifold 46 encircles the upper portion of post 29 and communicates with the interior of said post 29 through ports 47. This vacuum manifold 46 may be welded or brazed to the post 29 to form a vacuum tight connection. Vacuum seal means 48 may be provided in the tubular post 29 below the ports 47.

The drawings show an eight station machine in which the table 26 is provided with eight of the recesses for the reception of containers to be vacuumized and vacuumizing means is provided at each of these stations. Obviously, the machine may be constructed with more or less stations, as desired.

An upright guide member 50 is fixedly secured to the table 26 at the location of each station. These guide members 50, eight in number, are positioned a short distance inwardly from the recesses 27, in substantial alignment with the outer circumferential portion of the track ring 20, and are spaced at equal distances from each other around the table. These guide members 50 are preferably of channel shaped cross section. Vertically movable slide members 51 are supported and guided within the guide members 50. Holding members 52 retain the slide members 51 in the guide members 50. The upper ends of the slide members 51 project above the top end portions of the guide members 50 and have rollers 53 rotatably mounted thereon. The axis of the rollers 53 are at right angles to the slide members 51 and said rollers are operatively positioned to run between the upper flange 54 and the lower flange 55 of the track ring 20. The diameter of the rollers 53 is substantially less than the distance between the upper and lower flanges 54 and 55 of the track ring 20. The rollers 53 may operate in engagement with either one of these flanges 54 or 55, depending on the condition under which the station is operating, as hereinafter described.

Figure 2:
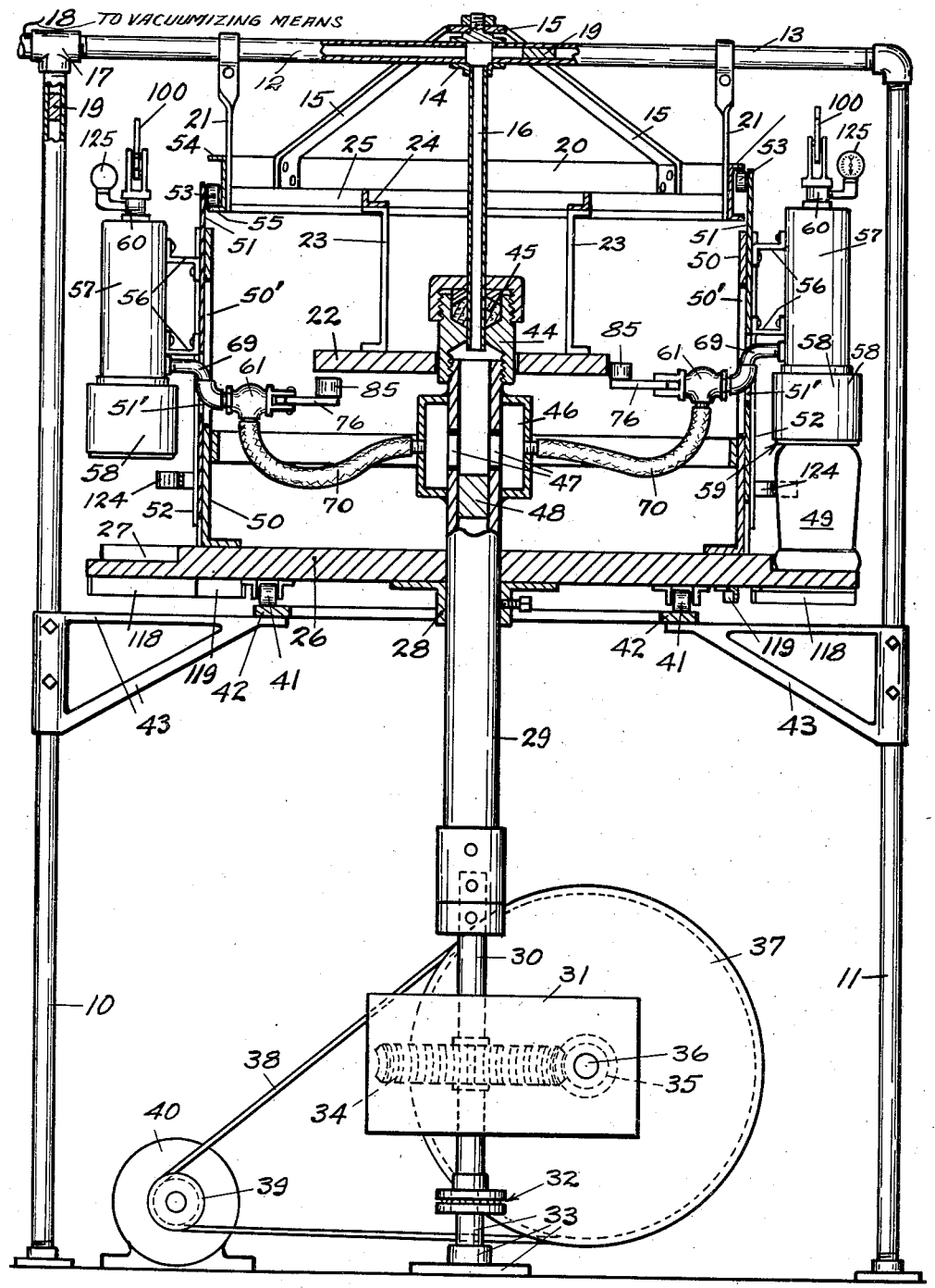
Fig. 2 is a vertical section of the same substantially on broken line 2—2 of Figure 1, parts being shown in elevation and other parts being omitted.

Each slide 51 is rigidly secured by brackets 56 to a vacuumizing and sealing receptacle 57. Each vacuumizing and sealing receptacle 57, see Fig. 3, is provided with a cylindrical lower portion 58 having a sealing ring 59 of rubber or like material supported thereby. The sealing ring 59 is adapted to engage the shouldered neck portion of a glass container 49 and make a vacuum tight seal with said container when the vacuumizing and sealing receptacle is lowered over the top portion of a container 49 which rests on the table 26. A relief valve 60, Fig. 6, is connected with the upper portion of each vacuumizing and sealing receptacle 57. A vacuum control valve 61, Figs. 1, 2, and 4, is connected by pipe means 69 with the side of each receptacle 57. Each pipe means 69 is herein disclosed as extending through an opening 51' in the adjacent slide 52 and a slot 50' in the adjacent bracket 50.

The receptacle 57 is adapted to receive a plurality of caps 62 to be applied to and sealed onto the cap receiving portions surrounding the open top ends of the containers. Each of the caps 62 is provided with a rubber sealing ring 63 for sealing contact with the cap receiving portion of a container. A plurality of these caps 62, positioned one upon another, are inserted into the vacuumizing and sealing receptacle from the bottom thereof. The caps 62 within the receptacle 57 are supported by springs 64 which have V shaped portions 65 on which the lowermost cap 62 rests. Perforations 65' are provided in the V shaped portions 65 to afford a better engagement between the V shaped portions 65 and the edges of the caps. The lower end portions 66 of the springs 64 are inclined outwardly to facilitate reception of the caps 62 and to form guiding and positioning means for the containers relative to the vacuumizing receptacles. The lower end portion of the receptacle 57 extends into the cylindrical portion 58. The springs 64 are positioned in notches 67 in the lower end portion of the receptacle 57. When a vacuumizing and sealing receptacle is lowered over the upper end portion of a container 47, the lowermost cap 62 will rest squarely on the top of said container in a position for sealing.

The vacuum control valves 61, more clearly shown in Fig. 4, each comprises a valve housing having a chamber 68 which communicates with a flexible conduit or hose 70. Each hose 70 is communicatively connected with the vacuum manifold 46. The valve chamber 68 further communicates through a cylindrical passageway 71 with the interior of the vacuumizing and sealing receptacle 57. A valve 72 on a valve stem 73 is operatively disposed within the chamber 68. The valve 72 is urged into engagement with a valve seat 74 by a spring 75 and may be retracted away from said valve seat by a cam operated lever 76 positioned on the exterior of the valve. To obtain a slow application of the vacuum as the valve 72 is opened, I provide a valve member 77 of slightly tapered or frustro conical shape operable in the cylindrical passageway 71. This valve member 77 is rigid with the valve 72 and the larger end of said valve member 77 is positioned adjacent said valve 72 and is only slightly smaller in diameter than the cylindrical passageway 71. This affords a very restricted annular opening through which vacuum or suction may be exerted when the valve 72 is only retracted a short distance off of the seat 74. The valve member 77 is tapered slightly toward the outer end thereof, so that the area of the opening through which the vacuum is exerted is increased as the valve 72 is lifted farther off of the seat 74. The guide member 78, which may be of the cross sectional shape shown in Fig. 5, is provided on the end of the valve member 77. The passageway 71 is entirely closed when the valve 72 rests on the seat 74. This valve mechanism provides for the exertion of a gradually increasing vacuum over a substantial period of time while the table 26 is moving through a considerable angle. In the vacuumizing of containers filled with ground or finely divided material, as coffee, the slow and gradually increasing application of this vacuum avoids drawing the material out of the container and insures that substantially all of the air will be drawn out of the interstices between the particles of material and out of the container. The valve stem 73 extends outwardly through cap and packing gland means 79 at the end of the valve housing and said valve stem is provided with a spring 80 and nut means 81. The end 82 of the cam operated lever 76 is positioned between the spring 80 and the nut means 81. The cam operated lever 76 is fulcrumed on a pivot 83 which is supported by a bracket 84. The bracket 84 is rigid with the valve housing. A roller 85 is rotatably mounted on the end portion of each valve lever 76 and is adapted to roll on the peripheral portion of the cam member 22 when a container to be vacuumized is operatively engaged by the vacuumizing member 57 with which the valve is connected.

The periphery of the cam member 22 is provided with a cutaway or inoperative section extending from a drop off or vacuum cut-off shoulder 86 to a point 87 at which the opening of the vacuum control valves commences. This inoperative section preferably extends about one-fourth of the distance around the cam 22. As considered in a clockwise direction from the point 87 in Fig. 2, the periphery of the cam 22 is of expanding spiral shape throughout substantially the next 210 degrees to the point 88. From the point 88 on around to the drop off shoulder 86, the periphery of this cam may follow the path of a circular arc described from the axis of the machine. This provides for slowly and gradually opening the vacuum control valves while the rollers 85 are moving around the cam from the point 87 to the point 88 and for holding said valves open while the rollers 85 are moving from the point 88 to the drop off shoulder 86. When the rollers 85 drop off of the shoulder 86, the valves 72 are entirely closed and remain closed until the rollers again reach the point 87.

The relief valves 60, each comprises a housing threaded to screw into the vacuumizing and sealing receptacles 57 and provided with a passageway 90. A valve member 91 is movable onto and off of a valve seat 92 and is provided with a rigidly connected guide member 89 movable in the passageway 90. The valve 91 has a stem 93 connected by a pin 94 with a valve operating lever 95. The lever 95 is fulcrumed on a pivot 96 which is supported by a forked bracket member 97. One end portion of the lever 95 is guided between the two parts of another forked bracket 98 and is connected with a spring 99 which normally urges the valve 91 into closed position. As this valve 91 is subject to the suction within the vacuumizing and sealing receptacle 57, it will normally be held closed by suction and the spring 99 will only need to be strong enough to return said valve 91 to closed position after it has been opened. The end 100 of the lever 95, extending to the left in Fig. 6, is inclined upwardly and is adapted to engage with a relief valve operating member or trip bar 101 which is relatively fixed and extends outwardly from the track ring 20 into the path of the upwardly inclined ends 100 of the valve operating levers 95. An upwardly inclined retarding member 102 extends outwardly from the trip bar 101. The retarding member 102 is positioned so as to be engaged by the end 100 of the lever 95 after the end 100 has passed under the trip bar 101. This retarding member 102 retards the closing of the valve 91.

The strip bar 101, see Fig. 2, is positioned so that it will be engaged by the end 100 of the lever 95 immediately after the closing of the vacuum control valve 61. This relief valve 60 provides for a quick relief of the vacuum after the container has been completely vacuumized. This quick relief of the vacuum instantly and positively seats the lowermost cap 62 on the top of the container without permitting a lowering of the vacuum in the container. Even when the cap 62 has been bent or sprung out of shape, so that it does not rest squarely on the top of the container, I find that this quick relief of vacuum will seat and seal the bent or sprung cap without appreciable loss of vacuum in the container.

While the vacuumizing and sealing receptacles 57 and parts connected therewith are traveling through that portion of their cycle in which the vacuum is relieved and the vacuum control valve 61 is closed, said receptacles 57 are raised to permit the removal of containers which have been vacuumized and sealed and the insertion of containers to be vacuumized and sealed. This corresponds to that portion of the cycle in which the rollers 85 are traversing the distance between the drop-off shoulder 86 and the point 87 on the cam 22. For the purpose of raising the vacuumizing and sealing receptacles 57 during this portion of the cycle, I provide in the track member 20 a raised section 105 connected by inclined portions 106 and 107 with the track 20.

The position of the raised track section 105 corresponds approximately to the position of the flattened cam section between shoulder 86 and point 87.

The containers 49 to be vacuumized are placed in the machine and removed therefrom while the receptacles 57 are held in raised position. The feeding and removal of the containers is preferably done by automatic mechanism. The container feed means herein disclosed comprises a feed table 103 positioned at one side of the rotating table 26, Fig. 1. The feed table 103 is preferably arcuately recessed to receive the adjacent circular edge portion of the rotating table 26. An endless traveling conveyor belt 104 is movably disposed on the feed table 103 with one edge thereof in substantially tangential relation to the rotating table 26. The top side of the belt 104 is substantially on a level with the top of the table 26 in the recessed portions 27. The belt 104 moves in the direction indicated by the arrows in Figure 1. Guard rails 108, 109, 110 and 111 are provided along the sides of the belt 104 to prevent displacement of the containers 49. At substantially the location where the belt 104 is tangent to the table 26, provision is made for deflecting the containers 49 sidewise and placing them on the continuously rotating table 26. This is accomplished by curving a portion 112 of the outer guard rail 108 inwardly across the top of the belt and by providing a reciprocable feed member 113 movable transversely of the belt 104. The feed member 113 has guide means 114 and is connected with an operating rod 115 which extends downwardly through a slot 116 in the feed table 103 and thence toward the center of the continuously rotating table 26. A roller 117 is rotatably mounted on a portion of the operating rod 115 disposed beneath the continuously rotating table 26. This roller 117 is positioned to be engaged by cam plates 118 which are secured to the bottom side of the continuously rotating table 26 and positioned at an angle so that they will move the roller 117, together with the operating rod 115 and feed member 113, toward the center of the continuously rotating table 26 as said cam plates are moved past the roller 117. The cam plates 118 are positioned on the table 26 so that they will operate the feed member 113 and place a container 49 in each recess 27 underneath an elevated vacuumizing receptacle 57 as the table 26 rotates. Other cam plates 119 are provided in angular positions on the bottom of the table 26 to engage the roller 117 after it has passed off of the cam plates 118 and move the roller 117 together with the feed member 113 into retracted position.

A reversely bent flat spring member 120 is preferably provided for engaging the containers 49 just after they have been placed on the table to insure proper positioning of said containers before the vacuumizing and sealing members are lowered onto said containers.

A deflector member 121 extends out over the table 26 in a position to engage the vacuumized, sealed containers 49, which have been carried around the table 26. This deflector member 121 deflects said containers 49 back onto the endless traveling belt 104 by which said containers 49 are carried away. The deflector member 121 is positioned so that it will be engaged by the containers 49 after the vacuumizing and sealing members have been lifted clear of the containers 49.

A container engaging member 122, preferably of rubber, is pivotally mounted on the feed table 103 and positioned to engage the containers 49 while the vacuumizing receptacles are being lifted. This prevents the containers from being lifted by the vacuumizing receptacles as the V-shaped portions 65 of the springs 64 are raised past the sealed cap on the upper end of the container. A spring 123 urges the member 122 against the containers. This aids the ready separation of the lowermost cap from the caps thereabove as such lowermost cap is sealed to the jar by reason of the vacuum therein and will not be removed by the springs 64. On the other hand caps not sealed to the container will be readily retained by the V-shaped portions 65 of the springs 64.

Whenever the sealing ring 59 of one of the vacuumizing receptacles 57 rests on the shouldered neck portion of a container 49, the vacuumizing receptacle 57 will be held in an elevated position. Also the roller 53 will be pressed against the upper flange 54 of the track member 20 and the roller 85 of the vacuum control valve will be in the plane of the cam 22 and will engage with the periphery of said cam 22 and open and close the vacuum control valve 61 as the vacuumizing receptacle is moved around the cam 22. When no container is present under a vacuumizing receptacle 57 the cam roller 85 of the vacuum control valve carried by said receptacle 57 will travel around in a path below the path of the cam 22, as shown at the left in Figure 1, and the vacuum control valve will not be opened. Vertical movement, either up or down, of a vacuumizing receptacle 57 by the track member 20 will always take place when the cam roller 85, which is connected with said receptacle 57, is between the drop off shoulder 86 and the point 87 of the cam 22. As the roller 85 is retracted clear of the periphery of the cam 22 while traveling between cam shoulder 86 and point 87, see Figure 1, there can be no interference between any cam roller 85 and the cam 22 due to the up and down movement of the cam roller.

The operation of this vacuumizing and sealing machine may be summarized as follows: The table 26 is driven continuously at a constant speed of approximately one revolution in fourteen seconds. Vacuum is exerted through the conduits connected with the vacuum manifold 46 and containers 49, preferably glass jars, are supplied to the endless moving belt 104. The track ring 20 and cam 22 are fixedly supported from the frame of the machine. The rotating table 26 carries the vacuumizing receptacles and containers around the fixed track ring 20 and cam 22. Whenever there is a container 49 positioned under and in engagement with a vacuumizing receptacle 57, the roller 85 controlling the vacuum control valve 61, which is connected with that receptacle, will be elevated into an operative position as respects the cam 22 and the vacuum valve will be opened and closed at the proper time in the cycle. If no container 49 is present under a vacuumizing receptacle 57, then the corresponding cam engaging roller 58 will not be elevated but will move around in a path below the cam 22, as shown at the left in Fig. 2, and the vacuum control valve 61 will not be opened. This avoids opening the vacuum conduits to the atmosphere and avoids excessive lowering of the vacuum in the other receptacles, such as would occur if the vacuum conduits were opened directly to the atmosphere.

The difference between the diameters of the rollers 53 and the distance between the upper and lower track flanges 54 and 55 provides for two vertical positions for the vacuumizing receptacles. First, an upper position in which the receptacles are supported on the containers in sealing relation thereto, with the rollers 53 bearing against the upper track flange 54 and the cam rollers 85 in position for engagement with the cam 22. Second, a lower position in which the receptacles 57 are not supported by the containers but are allowed to drop down by gravity until the track rollers 53 roll on the lower track flange 55 and the cam rollers 85 are below and clear of the cam 22.

At the time any vacuumizing receptacle 57 is moving past the loading plunger 113, said receptacle will be elevated, by the raised section 105 of the track ring 20, high enough to receive a container 49. If, at this time, containers are available on the endless traveling belt 104, a container will be placed on the table 26 in the recess 27 directly below the vacuumizing receptacle. The curved guide member 112 together with the loading plunger 113 will insure the placing of the container 49 on the table 26 in a recess 27. The recess 27 together with a fixed stop member 124 insure approximately correct positioning of the container on the moving table 26. The inclined ends 66 of the resilient cap holding members 64 are the final positioning means and may shift the container 49 a short distance as they engage the upper end thereof, thus insuring accurate alignment of the container for the purpose of receiving a cap 62.

As the vacuumizing receptacle 57 moves away from the loading position, see operating diagram Fig. 10, the roller 53 engages with the downwardly inclined track ring section 107 and the vacuumizing receptacle is lowered into operative position with the ring 59 resting on the neck portion of the container 49. Immediately after the ring 59 engages and forms an air tight connection with the neck portion of the container 49, the cam roller 85 contacts the raised portion 87 of the cam 22 and the vacuum control valve 61 is slightly opened. This permits the air to be exhausted slowly from the container. The vacuum is applied so gradually that the cap, which rests loosely on the mouth of the container, is not displaced and the contents are not drawn out of the container. In vacuumizing granular materials, as ground coffee, it is essential that this vacuum be applied very gradually and slowly for the following reasons: (1) The particles of this material are of relatively light weight and are easily lifted by the vacuum. (2) The interstices between said particles are numerous and small and are present entirely to the bottom of the container and the air and gases must be exhausted from such interstices. (3) Even if a small number of the particles of this material are lifted, they may become lodged between the mouth of the container and the rubber sealing ring 63 of the cap and may thereby prevent an efficient vacuum seal.

For the above reasons, I construct the cam 22 so that the vacuum control valve will be opened slightly as the roller 85 passes over the point 87. From the point 87 the cam 22 expands gradually around to the point 88. This means that the opening of the vacuum control valve 61 will be gradually increased through an angle of about 210 degrees and during a period of substantially eight seconds. From the point 88 on around to the drop off shoulder 86 the periphery of the cam 22 is substantially a circle so that the vacuum control valve 61 will be held in maximum open position with the vacuum fully applied. I find that, with this slow and gradual application of the vacuum, the contents of the container will not be disturbed and a maximum vacuum, as indicated by a vacuum gauge 125 connected with the vacuumizing receptacle 57 will usually be obtained at about the time the maximum opening of the vacuum control valve, as indicated on the diagram Fig. 10, occurs. This vacuum is maintained at a maximum for a further period of time up to the location of "vacuum cut off" to insure that the air will substantially all be drawn out of the receptacle 49.

When the cam roller 85 drops off of the shoulder 86, the vacuum control valve 61 will be completely and instantly closed by the spring 75. Immediately after the closing of the vacuum control valve 61, the end 100 of the release valve lever arm 95 will engage the trip bar 101 and the relatively large valve member 91 will be snapped open. This provides a quick and substantially instantaneous release of vacuum and a quick increase of pressure on the cap 62, which rests on the mouth of the vacuumized container 49, thus providing efficient means for sealing the cap without loss of vacuum in the container 49.

Shortly after the opening of the vacuum release valve 60, the track roller 53 encounters the upward incline 106 of the track member 20 and the vacuumizing receptacle 57 is lifted clear of the container 49. The vacuumizing receptacle 57 then moves on toward the loading position while the vacuumized and sealed container encounters the deflector member 121 and is deflected back onto the belt 104 by which it is carried away.

At the time the vacuumizing receptacle 57 is being lifted clear of a vacuumized and sealed container 49, the rubber member 122 engaging the container 49 holds said container down. Also, before the lifting of the receptacle 49, the cap 62 on the container 49 will have been sealed to the top of the container 49 by vacuum and, as the receptacle 57 is lifted, the sealed cap on the container will be pulled loose from the next adjacent cap 62 thereabove. This will separate the caps 62 in the event there is any tendency for the caps to adhere together. The spring means 64 with the V shaped portions 65 having perforations 66 provides a resilient means capable of retaining all caps 62 except the cap which is sealed to the container 49, thus insuring a separation of the caps.

Obviously, changes may be made in the forms, dimensions, and arrangement of the parts of my invention, without departing from the principle thereof, the above setting forth only preferred forms of embodiment.

I claim:

1. In a device for vacuumizing and sealing containers, a vacuumizing and sealing receptacle movable in a continuous path and movable into and out of vacuumizing position with respect to a container; a vacuum control valve carried by and movable with said receptacle and communicatively connected therewith; vacuumizing means connected with said valve; and valve operating cam means operatively positioned in the said continuous path of said valve when said receptacle is in vacuumizing position relative to the container and out of the said continuous path of said valve when said receptacle is in nonvacuumizing position relative to the container.

2. In a device for vacuumizing and sealing containers, a vacuumizing and sealing receptacle movable horizontally in a continuous path and movable vertically into and out of vacuumizing engagement with a container while traveling in said horizontal path; valve means carried by and movable horizontally and vertically with said receptacle and operatively connected with said receptacle; vacuumizing means operatively connected with said valve means; means vertically positioning said receptacle and valve in a predetermined horizontal path; and valve operating means positioned in the said predetermined horizontal path of the valve means.

3. In a device for vacuumizing and sealing containers, a vacuumizing and sealing receptacle movable horizontally in a continuous path and movable vertically into and out of vacuumizing engagement with a container while traveling in said horizontal path; valve means carried by and movable horizontally and vertically with said receptacle and operatively connected with said receptacle; vacuumizing means operatively connected with said valve means; horizontally movable container supporting means operatively positioning a container to vertically support said receptacle and valve in an upper horizontal path; and valve operating means positioned in the upper horizontal path of the valve means.

4. In a device for vacuumizing and sealing containers, a vacuumizing and sealing receptacle movable horizontally in a continuous path and movable vertically into and out of vacuumizing engagement with a container while traveling in said horizontal path; cam actuated and relatively slowly operable valve means operatively connected with said receptacle and having cam engaging means carried by and movable horizontally and vertically with said receptacle; vacuumizing means operatively connected with said valve means; means vertically positioning said receptacle and said cam engaging means in a predetermined horizontal path; and stationary cam means positioned in the path of travel of said cam engaging means and having a relatively low pitch for relatively slowly opening said valve means.

5. In a device for vacuumizing and sealing containers, a vacuumizing and sealing receptacle; means carried by said receptacle providing an air tight connection with a container to be vacuumized; and resilient cap supporting means within said receptacle supporting a plurality of caps with the lowermost cap positioned to operatively engage with the top end of a container received within said receptacle, said cap supporting means permitting withdrawal of the lowermost cap with the container and retaining the balance of the caps in the receptacle.

6. In a device for vacuumizing and sealing containers, a cap receptacle receiving a plurality of caps in adjacent superposed relation; means sealable by vacuum with the underside of the lowermost cap in the receptacle while the caps are in said adjacent superposed relation; cap retaining means mechanically and resiliently engaging the edges of the caps in the receptacle with a pressure substantially less than that sufficient to release said means sealable by vacuum from the lowermost cap; and means providing relative movement between the said means sealable by vacuum with the lowermost cap and the cap retaining means, whereby the lowermost cap in the receptacle is held by said means sealable by vacuum and the caps thereabove are retained by the cap retaining means and separation of the lowermost cap from those directly thereabove occurs with said relative movement between said means.

7. In a device for vacuumizing and sealing containers, a vacuumizing and sealing receptacle carrying therein a plurality of caps in adjacent superposed relation; means sealable by vacuum with the underside of the lowermost cap in the receptacle while the caps are in said adjacent superposed relation; cap retaining means mechanically and resiliently engaging the edges of the caps in the receptacle with a pressure substantially less than that sufficient to release said means sealable by vacuum from the lowermost cap; and means providing relative movement between the said means sealable by vacuum with the lowermost cap and the cap retaining means, whereby the lowermost cap in the receptacle is held by said means sealable by vacuum and the caps thereabove are retained by the cap retaining means and separation of the lowermost cap from those directly thereabove occurs with said relative movement between said means.

8. In a device for vacuumizing and sealing containers, container supporting means; a vertically movably mounted vacuumizing and sealing receptacle movable into and out of operative vacuumizing position relative to the container; means carried by said receptacle providing an air tight connection with a container to be vacuumized and supporting said receptacle on the container; a track member providing upper and lower spaced apart flanges; a roller member connected with said receptacle and operatively positioned between said flanges, the diameter of said roller being less than the distance between said track flanges providing an elevated position for said receptacle with the roller in operative engagement with the upper track flange when the receptacle is supported by a container and a lowered position for said receptacle with the roller in operative engagement with said lower track flange, when the receptacle is unsupported by a container; vacuumizing means connected with the receptacle; valve operating means; valve means between said vacuumizing means and said receptacle; and valve control means vertically movable with said container operatively engaging said valve operating means in said elevated position and disengaged from said valve operating means in said lowered position.

JOSEPH W. UREN.